UNITED STATES PATENT OFFICE.

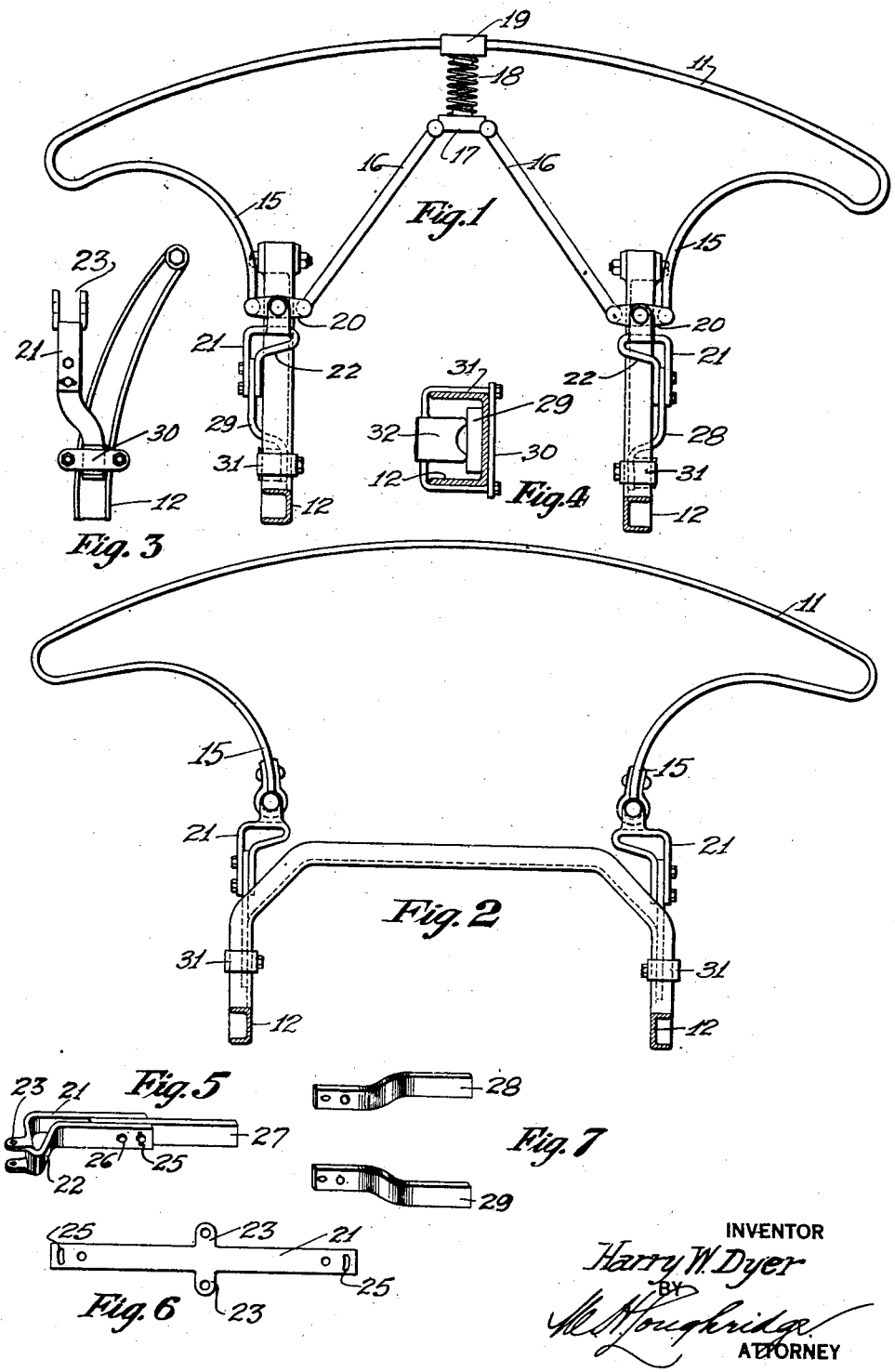

HARRY W. DYER, OF EAST ORANGE, NEW JERSEY.

AUTOMOBILE-BRACKET.

1,375,834. Specification of Letters Patent. Patented Apr. 26, 1921.

Application filed April 15, 1920. Serial No. 374,071.

*To all whom it may concern:*

Be it known that I, HARRY W. DYER, a citizen of the United States, and resident of East Orange, in the county of Essex and State of New Jersey, have invented certain new and useful Improvements in Automobile-Brackets, of which the following is a specification.

This invention relates to automobiles and particularly to a bracket attachment for automobiles and has for an object to provide a bracket that can be universally adapted to different styles of cars, that can be used on either side of said cars, that can be made from a section of sheet stock, that can be adjusted relative to the car body and that can be positioned relative to the car body. These objects are obtained by the construction shown in the accompanying drawings forming part of this specification, in which, Figure 1, is a plan view of an automobile bumper supported by brackets constructed according to this invention, Fig. 2, is a plan view of another type of bumper supported by the same type of brackets as in Fig. 1; Fig. 3 is a side elevation of the bracket, Fig. 4 is a detail of the securing clamp; Figs. 5, 6 and 7 show the bracket and the details of its construction.

In the drawings, 11 represents an elliptical spring constructed according to any of the well known types of bumpers. 12 is the chassis of the automobile. The ends of spring 11 connect at 15 to the outer end of pivoted lever 20 and the inner ends of this lever connect to the thrust rods 16 which terminate in the pad 17. Coil spring 18 is supported between pad 17 and pad 19 secured to spring 11 as shown in Fig. 1.

The bracket supporting lever 20 is made in two parts as shown in Figs. 5, 6 and 7. The part 21 is developed from flat stock as shown in Fig. 6 and has the lugs 23 turned over to form the pivot points of lever 20. This part is turned into the offset loop as shown in Fig. 5 and is bolted to the clamping member 27, 28 or 29 as may be suitable for the particular style of car frame to which the bracket is attached. It will be noted that the bolt hole 25 is elongated or slotted permitting adjustment of alinement between parts 21 and 27, 28 or 29; the brackets 21 can thus be tilted to adjust the vertical height of spring 11; when the adjustment is made bolts 25 and 26 are tightened thus rigidly securing part 21 to its support.

The clamping members 27, 28 or 29 are clamped to the frame 12 by any suitable clamping means such as the shackle 31 and plate 30, Fig. 4, which bring the clamping block 32 to bear upon the clamping member 29 thus rigidly securing this part to the frame.

For a bumper bracket it is desirable that the lugs 23 aline with the sides of the chassis frame. For this purpose part 21 is offset at 22 as shown. However this part is reversible and is similar for each side of the frame being turned over so that the offset points inward as shown. When the frame 12 is made of channel iron and curved as shown in Fig. 3 clamping members 28 and 29 may be used bent to clear the channel frame as shown. Where the frame is not curved as in Fig. 2, a straight clamping member 27 may be used; also in this figure it will be noted that the ends of spring 11 connect directly to the lugs 23 at 15 as shown. By making the bracket in two parts the important result is obtained of having a part which is inexpensive conform to the contour of the particular car to which it is to be attached while the more expensive part of the bracket is universal in its adaption to any type of car. Thus at small expense brackets can be stocked for a variety of cars.

Having thus described my invention, I claim:

1. A bracket attachment for automobiles consisting of a looped member and a clamping piece, said looped member provided with lugs and secured to said clamping piece and said clamping piece secured to said automobile.

2. A pair of offset bracket attachments for automobiles, each bracket consisting of a clamping member and a supporting member secured together, said clamping member secured to the frame of said automobile and said supporting member capable of being used for one of said pair with one side up and capable of being used for the other of said pair with the other side up.

3. A bracket attachment for automobiles consisting of a looped member developed from flat stock having turned over lugs and a clamping piece, said member secured to said clamping piece and said clamping piece secured to said automobile.

4. A bracket attachment for automobiles consisting of a flat shaped member with attaching means and a clamping piece, said member secured to said clamping piece, said clamping piece secured to the frame of said automobile and offset to suit the contour of said frame.

5. A bracket attachment for automobiles consisting of a flat shaped member with attaching means positioned with relation to the frame of said automobile and a clamping piece, said member secured to said clamping piece, said clamping piece secured to the frame of said automobile and offset to position said member in the horizontal plane of the frame of said automobile.

6. A bracket attachment for automobiles consisting of a member with attaching means including a pin positioned on the axis of the frame of said automobile and a clamping piece, said member secured to said clamping piece, said clamping piece secured to the side of said frame and curved to position said pin.

7. A pair of bracket attachments for automobiles consisting of similar looped members positioned with relation to the frame of said automobile, a clamping piece supporting each of said members, said clamping pieces secured to the frame of said automobile and offset to position said looped members in the horizontal plane of the frame of said automobile on the axis of said frame.

8. A bracket attachment for automobiles consisting of a member supported on the neutral axis of the side frame of said automobile, said member supporting a vertical pin and means for adjusting the position of said pin relative to said frame.

9. A bracket attachment for automobile frames consisting of a plurality of members adjustably secured together, one of said members including attaching means positioned in the axial plane of one side of said frame and capable of being used either side up and the other of said members secured to said automobile frame.

10. A bumper bracket for automobiles consisting of a bracket attachment in two parts, one of said parts offset and secured to the frame of said automobile, the other part pivotally secured to said first mentioned part and vertically adjustable on said pivot in the arc of a circle, whereby the height of said bumper is adjusted.

11. A bumper bracket consisting of a looped member and a clamping piece for securing a bumper to automobiles, means for attaching said looped member to said bumper, the ends of said member formed in a jaw to clamp said clamping piece and said clamping piece secured to the frame of said automobile.

Signed at New York, in the county of New York and State of New York, this 2nd day of April, A. D. 1920.

HARRY W. DYER.